United States Patent Office 3,127,409
Patented Mar. 31, 1964

3,127,409
NOVEL DIHYDROPYRIDOBENZOXAZEPINES AND DIHYDROPYRIDOBENZTHIAZEPINES
Harry L. Yale, New Brunswick, Francis A. Sowinski, Edison, and Jack Bernstein, New Brunswick, N.J., assignors to Olin Mathieson Chemical Corporation, New York, N.Y., a corporation of Virginia
No Drawing. Filed Aug. 8, 1962, Ser. No. 215,548
7 Claims. (Cl. 260—295)

This invention relates to new basically substituted dihydropyridobenzoxa (and thia) zepines (and their salts) having valuable therapeutic properties, process for the preparation of the same, and new intermediates useful in such processes.

The therapeutically active compounds of this invention include dihydropyridobenzoxa (and thia) zepines of the general formula

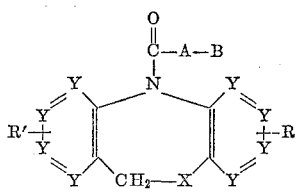

wherein A is a lower alkylene radical; B is a basic saturated nitrogen-containing radical of less than twelve carbon atoms; X is oxy or thio; one Y is aza and the remaining Y's are carbon; and R and R' are the same or different and represent hydrogen, halogen, lower alkyl, lower alkoxy, trifluoromethyl, trifluoromethylmercapto, trifluoromethoxy or N,N-dimethylaminosulfonyl. Among the suitable radicals represented by the symbol B are: amino; (lower alkyl)amino; di(lower alkyl)amino; (hydroxy-lower alkyl)amino; di(hydroxy-lower alkyl)-amino; and basic saturated 5 to 7 membered N-heterocyclic radicals of less than twelve carbon atoms, as exemplified by piperidyl [i.e., piperidino, 2-piperidyl, 3-piperidyl and 4-piperidyl]; (lower alkyl)piperidyl [e.g., 2,2 or 4-(lower alkyl)piperidino or 2,3 or 4-(N-lower alkyl)piperidyl]; di(lower alkyl)piperidyl [e.g., 2,4-, 2,5-, or 3,5-di(lower alkyl)piperidino, or 2,3 or 4-(N-lower alkyl)piperidyl]; (lower alkoxy)piperidyl; homopiperidino; pyrrolidyl; (lower alkyl)pyrrolidyl; di(lower alkyl)-pyrrolidyl; (lower alkoxy)pyrrolidyl; morpholinyl [i.e., morpholino, 2-morpholinyl and 3-morpholinyl]; (lower alkyl)morpholinyl; di(lower alkyl)morpholinyl; (lower alkoxy)morpholinyl; thiamorpholinyl; (lower alkyl)thiamorpholinyl; di(lower alkyl)thiamorpholinyl; (lower alkoxy)thiamorpholinyl; piperazyl; (lower alkyl)piperazyl (e.g., N⁴-methylpiperazino); di(lower alkyl)piperazyl; (lower alkoxy)piperazyl; (hydroxy-lower alkyl)-piperazyl [e.g., N⁴-(2-hydroxyethyl)piperazino]; (lower alkanoyloxyalkyl)piperazyl [e.g., N⁴ - (2 - acetoxyethyl)-piperazino]; (hydroxy-lower alkoxy-lower alkyl)piperazyl [e.g., N⁴-(2-hydroxyethoxyethyl)piperazino]; (carbo-lower alkoxy)piperazyl [e.g., N⁴-(2-carbomethoxy, carboethoxy, or carbopropoxy)piperazino]; and homopiperazine. The terms "lower alkyl," "lower alkoxy," and "lower alkylene," as employed herein, include both straight and branched chain radicals of less than eight carbon atoms. The particularly preferred compounds are those wherein A is a lower alkylene radical of two to three carbon atoms (i.e., ethylene, trimethylene-1,3 and propylene-1,2); B represents a di(lower alkyl)amino radical, an N⁴-(lower alkyl)piperazino radical, an N⁴-(2-hydroxyethyl)piperazino radical, or an N⁴-(2-acetoxyethyl)piperazino radical, and R and R' are hydrogen.

As to salts of the bases of this invention, those coming within the purview of this invention include the acid-addition salts, particularly, the non-toxic acid-addition salts. Acids useful for preparing the acid-addition salts, include, inter alia, inorganic acids, such as the hydrohalic acids (e.g., hydrochloric and hydrobromic acid), sulfuric acid, nitric acid and phosphoric acid, and organic acids, such as oxalic, maleic, tartaric, citric, acetic and succinic acid.

The compounds of this invention are therapeutically active compounds which are utilizable both as ataractic agents, and thus may be used in the treatment of depressed psychotic states, and as antihistamines. For these purposes they may be administered orally or parenterally in conventional dosage forms such as tablets, capsules, injectables or the like by incorporating the appropriate dose of the compound with carriers according to accepted pharmaceutical practice.

The compounds of this invention are prepared by the process of this invention which is shown in the following equation, wherein, R, R', X, Y, A and B are as hereinbefore defined:

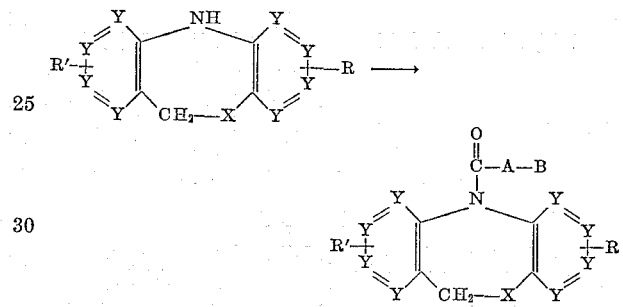

Suitable starting materials for the process of this invention can be prepared as disclosed in our U.S. Patent application, Serial No. 215,549, filed on even date herewith. These starting materials are treated with a basically substituted lower alkanoyl halide of the formula: B—A—CO halide, wherein B and A are as hereinbefore defined, the reaction preferably being conducted in the presence of a basic condensation reagent, such as sodium hydride, to yield the final products of this invention. The same compounds can alternatively be prepared in two steps, by first reacting with a halo-(lower alkanoyl) halide of the formula: (halo)-A—CO halide and then with a base of the formula: BH. To prepare the acid-addition salts, the resulting base is treated with the desired acid in the usual manner.

The following examples illustrate the invention (all temperatures being in centigrade).

EXAMPLE 1

2-Dimethylaminoethyl 5,10-Dihydropyrido[3,2-b] [4,1]Benzoxazepin-5-Yl Ketone (a) Preparation of 2-chloroethyl 5,10-dihydropyrido-[3,2-b] [4,1]benzoxazepin-5-yl ketone.—A mixture of 9.85 g. of 5,10-dihydropyrido[3,2-b] [4,1]benzoxazepine, 11.7 g. of β-chloropropionyl chloride and 150 ml. of dry toluene is refluxed for four hours, treated with Darco, filtered, and the filtrate concentrated to dryness to leave 2 - chloroethyl 5,10 - dihydropyrido[3,2 - b] [4,1]benzoxazepin-5-yl ketone.

(b). Preparation of 2-dimethylaminoethyl 5,10-dihydropyrido-[3,2-b] [4,1]benzoxazepin-5-yl ketone. — A mixture of 11.95 g. of 2-chloroethyl-5,10-dihydropyrido [3,2-b] [4,1]benboxazepin-5-yl ketone, 18.0 g. of anhydrous dimethylamine and 50 ml. of toluene is heated in a sealed tube at 60° for 24 hours. The reaction mixture, cooled, filtered and the filtrate is concentrated to dryness. The residual material is recrystallized from diisopropyl to yield the product ether.

EXAMPLE 2

*9-Chloro-2-Dimethylaminoethyl-6,11-Dihydropyrido [3,4-b]-[4,1]Benzoxazepin-11-Yl Ketone*

Following the procedure of Example 1 but substituting 11.6 g. of 9-chloro-6,11-dihydropyrido[3,4-dihydropyrido [3,4-b] [4,1]benzoxazepine, there is obtained 9-chloro-2-dimethylaminoethyl - 6,11 - dihydropyrido[3,4-b] [4,1] benzoxazepine-11-yl ketone.

EXAMPLE 3

*3-Chloro Diethylaminomethyl-5,10-Dihydropyrido [3,2-b]-[4,1]-Benzothiazepin-5-Yl Ketone*

Following the procedure of Example 1a but substituting 12.5 g. of 3-chloro-5,10-dihydropyrido[3,2-b] [4,1] benzothiazepine and 10.4 g. of chloroacetyl chloride, there is obtained 3-chloro-5-(chloromethyl)-5,11-dihydropyrido [3,2-b]-[4,1]benzothiazepin-5-yl ketone. Following the procedure of Example 1b but substituting 16.4 g. of the product above and 28.2 g. of anhydrous diethylamine, there is obtained 3-chloro-5-diethylaminomethyl-5,11-dihydropyrido[3,2-b]-[4,1]benzothiazepin-5-yl ketone.

EXAMPLE 4

*2-Piperidinoethyl 5,10-Dihydropyrido[3,2-b] [4,1]-Benzoxazepin-5-Yl Ketone*

Following the procedure of Example 1 but substituting an equivalent amount of anhydrous piperidine for the dimethylamine in step b, there is obtained 2-piperidinoethyl 5,10-dihydro[3,2-b] [4,1]benzoxazepin-5-yl ketone.

EXAMPLE 5

*2-Dimethylaminoethyl 5,11-Dihydro-9-(Trifluoromethyl)-Pyrido[4,3-c] [1,5]Benzoxazepin-11-Yl Ketone*

Following the procedure of Example 1, but substituting 13.3 g. of 5,11-dihydro-9-(trifluoromethyl)pyrido [4,3-c]-[1,5]-benzoxazepine for the 5,10-dihydropyrido[3,2-b] [4,1]-benzoxazepine in step a, there is obtained 2-dimethylaminoethyl 5,11-dihydro-9-(trifluoromethyl)pyrido[4,3] [1,5]-benzoxazepin-11-yl ketone.

EXAMPLE 6

*2 - Dimethylaminoethyl 9 - Chloro-5,11 - Dihydropyrido [4,3-b]-[1,5]Benzoxazepin-11-Yl Ketone*

Following the procedure of Example 1, but substituting 13.3 g. of 9-chloro-5,11-dihydropyrido[4,3-b] [1,5]benzoxazepine for the 5,10-dihydropyrido[3,2-b] [4,1]benzoxazepine in step a, there is obtained 2-dimethylaminoethyl 9-chloro-5,11-dihydropyrido[4,3-b] [1,5]-benzoxazepin-11-yl ketone.

EXAMPLE 7

*2-Dimethylaminoethyl 3,7-Dichloro-5,10-Dihydropyrido-[3,2-b][4,1]Benzoxazepin-5-Yl Ketone*

Following the procedure of Example 1 but substituting an equivalent amount of 3,7-dichloro-5,10-dihydropyrido [3,2-b]-[4,1]benzoxazepin for the benzoxazepine in step a, 2-dimethylaminoethyl 3,7-dichloro-5,10-dihydropyrido [3,2-b]-[4,1]benzoxazepin-5-yl ketone is obtained.

EXAMPLE 8

*2-Dimethylaminoethyl 5,11-Dihydro-9-Methylpyrido [4,3-c] [1,5]Benzoxazepin-11-Yl Ketone*

Following the procedure of Example 1 but substituting an equivalent amount of 5,11-dihydro-9-methylpyrido [4,3-c] [1,5]benzoxazepin-11-yl ketone for the benzoxazepine in step a, 2-dimethylaminoethyl 5,11-dihydro-9-methylpyrido[4,3-c]-[1,5]benzoxazepin-11-yl ketone is obtained.

Similarly, by substituting an equivalent amount of 3-chloro - 7 - (trifluoromethoxy)-5,10-dihydropyrido[3,2-b] - [4,1]benzothiazepine, 3 - chloro - 7 - (trifluoromethylmercapto) - 5,10 - dihydropyrido[3,2-b] [4,1]-benzothiazepine or 3-chloro-7-(N,N-dimethylaminosulfonyl) - 5,10 - dihydropyrido[3,2-b] - [4,1]benzothiazepine for the 5,10-dihydropyrido[3,2-b]-[4,1]benzoxazepine in step a of Example 1, 2-dimethylaminoethyl 3-chloro - 7 - (trifluoromethoxy) - 5,10 - dihydropyrido [3,2-b] - [4,1]benzothiazepin - 5 - yl - ketone, 2 - dimethylaminoethyl 3-chloro-7-(trifluoromethylmercapto)-5,10 - dihydropyrido[3,2-b] - [4,1]benzothiazepin - 5 - yl ketone and 2-dimethylaminoethyl 3-chloro-7-(N,N-dimethylaminosulfonyl) - 5,10 - dihydropyrido - [3,2-b] [4,1]benzothiazepin-5-yl ketone are prepared, respectively.

EXAMPLE 9

*1-(N⁴-Methylpiperazino)Ethyl 5,10-Dihydropyrido [3,2-b]-[4,1]Benzoxazepin-5-Yl Ketone*

Following the procedure of Example 1, but substituting an equivalent amount of N-methylpiperazine for the dimethylamine in step b, 2-($N^4$-methylpiperazino)ethyl 5,10 - dihydropyrido[3,2-b] [4,1]benzoxazepin - 5 - yl ketone is obtained.

Similarly, by substituting an equivalent amount of N-(2-hydroxyethyl) piperazine, N-(2-acetoxyethyl)piperazine, or N - (2 - hydroxyethoxyethyl)piperazine for the dimethylamine in step b of Example 1, 2-[$N^4$-(2-hydroxyethyl)piperazino]ethyl 5,10 - dihydropyrido[3,2-b] [4,1] benzoxazepin-5-yl ketone, 2-[$N^4$-(2-acetoxyethyl)piperazino]ethyl 5,10-dihydropyrido [3,2-b] [4,1]benzoxazepin-5-yl ketone, and 2-[$N^4$-(2-hydroxyethoxyethyl)piperazino] ethyl 5,10-dihydropyrido [3,2-b] [4,1]benzoxazepin-5-yl ketone are obtained respectively.

The invention may be variously otherwise embodied within the scope of the appended claims.

What is claimed is:

1. A compound selected from the group consisting of bases of the formula

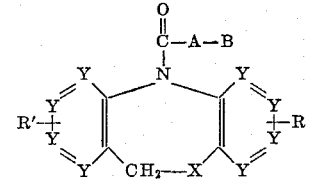

wherein A is lower alkylene, B is selected from the group consisting of amino, (lower alkyl)amino, di(lower alkyl)amino, (hydroxy-lower alkyl)amino, di(hydroxy-lower alkyl)amino, piperidyl, (lower alkyl)piperidyl, di(lower alkyl)piperidyl, (lower alkoxy)piperidly, homopiperidino, pyrrolidyl, (lower alkyl)pyrrolidyl, di(lower alkyl)pyrrolidyl, (lower alkoxy)pyrrolidyl, morhpolinyl, (lower alkyl)morhpolinyl, di(lower alkyl)morpholinyl, (lower alkoxy)morpholinyl, thiamorpholinyl, (lower alkyl)thiamorpholinyl, di(lower alkyl)thiamorpholinyl, (lower alkoxy)thiamorpholinyl, piperazyl, (lower alkyl)-piperazyl, di(lower alkyl)piperazyl, (lower alkoxy)piperazyl, (hydroxy-lower alkyl)piperazyl, (lower alkanoyloxyalkyl)piperazyl, (hydroxy-lower alkoxy-lower alkyl)-piperazyl, and homopiperazyl, X is selected from the group consisting of oxy and thio, and Y is aza and the remaining Y's are carbon, and R and R' are each selected from the group consisting of hydrogen, halogen, lower alkyl, lower alkoxy, trifluoromethyl, trifluoromethylmercapto, trifluoromethoxy and N,N-dimethylaminosulfonyl, and non-toxic acid-addition salts thereof.

2. Di(lower alkyl)amino(lower alkyl) 5,10-dihydropyrido[3,2-b] [4,1]benzoxazepin-5-yl ketone.

3. A non-toxic acid-addition salt of the compound of claim 2.

4. 2 - dimethylaminoethyl 5,10 - dihydropyrido[3,2-b][4,1]benzoxazepin-5-yl ketone.

5. A compound of the formula

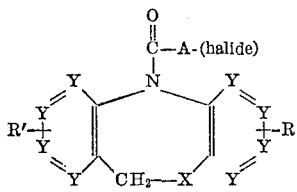

wherein A is lower alkylene, X is selected from the group consisting of oxy and thio, one Y is aza and the other Y's are carbon, and R and R' are each selected from the group consisting of hydrogen, halogen, lower alkyl, lower alkoxy, trifluoromethyl, trifluoromethylmercapto, trirfluoromethoxy and N,N-dimethylaminosulfonyl.

6. Chloro(lower alkyl) 5,10-dihydropyrido[3,2-b] [4,1]-benzoxazepin-5-yl ketone.

7. 2 - chloroethyl 5,10 - dihydropyrido[3,2 - b] [4,1]-benzoxazepin-5-yl ketone

References Cited in the file of this patent
UNITED STATES PATENTS

| | | |
|---|---|---|
| 2,943,086 | Yale et al. | June 28, 1960 |
| 2,974,139 | Schuler et al. | Mar. 7, 1961 |
| 3,038,896 | Habicht et al. | June 12, 1962 |
| 3,079,393 | Yale et al. | Feb. 26, 1963 |
| 3,079,400 | Yale et al. | Feb. 26, 1963 |

FOREIGN PATENTS

| | | |
|---|---|---|
| 1,176,115 | France | Apr. 7, 1959 |

OTHER REFERENCES

Kopp et al.: "Arch. der Pharm.," vol. 295, pp. 99–106 (1962).

Bernthsen et al.: "Organic Chemistry," 4th ed., pp. 681–689 (1941) (Blackie).

German Auslegeschrift, 1,102,753 Mar. 23, 1961.

UNITED STATES PATENT OFFICE
CERTIFICATE OF CORRECTION

Patent No. 3,127,409　　　　　　　　　　March 31, 1964

Harry L. Yale et al.

It is hereby certified that error appears in the above numbered patent requiring correction and that the said Letters Patent should read as corrected below.

Column 4, line 53, for "piperidly" read -- piperidyl --; lines 55 and 56, for "morhpolinyl", each occurrence, read -- morpholinyl --; column 5, lines 2 to 8, the formula should appear as shown below instead of as in the patent:

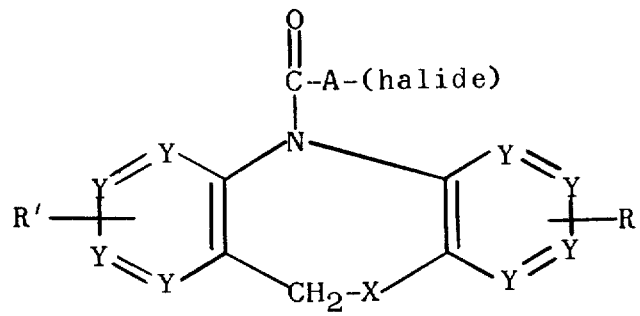

same column 5, line 15, for "trirfluoromethoxy" read -- trifluoromethoxy --.

Signed and sealed this 21st day of July 1964.

(SEAL)
Attest:

ESTON G. JOHNSON　　　　　　　　　　EDWARD J. BRENNER
Attesting Officer　　　　　　　　　　Commissioner of Patents